United States Patent [19]

Yamazaki et al.

[11] Patent Number: 4,667,264

[45] Date of Patent: May 19, 1987

[54] APPARATUS FOR CONTROLLING THE STARTING OF A THREE PHASE LOAD WITH ITS NORMAL PHASE SEQUENCE

[75] Inventors: Sigeru Yamazaki; Mitsuhito Nakayama, both of Kanagawa, Japan

[73] Assignee: Ebara Corporation, Tokyo, Japan

[21] Appl. No.: 839,821

[22] Filed: Mar. 12, 1986

Related U.S. Application Data

[63] Continuation of Ser. No. 641,556, Aug. 16, 1984, abandoned.

[30] Foreign Application Priority Data

Aug. 16, 1983 [JP] Japan .......................... 58-126751[U]

[51] Int. Cl.⁴ ............................................ H02H 3/353
[52] U.S. Cl. ........................................ 361/77; 307/127
[58] Field of Search ............................... 361/77, 85, 76; 307/127

[56] References Cited

U.S. PATENT DOCUMENTS

| | | | |
|---|---|---|---|
| 2,724,782 | 11/1955 | Holloway | 361/77 |
| 2,975,334 | 3/1961 | Callan | 361/77 |
| 3,708,719 | 1/1973 | Ishikawa | 361/77 |
| 4,021,704 | 1/1977 | Norbeck | 361/77 |
| 4,163,270 | 7/1979 | Marus | 361/77 |
| 4,196,378 | 1/1980 | Shirai | 361/77 |

Primary Examiner—David Smith, Jr.
Attorney, Agent, or Firm—Oblon, Fisher, Spivak, McClelland & Maier

[57] ABSTRACT

An apparatus for controlling the starting of a three phase load in its normal phase sequence. The apparatus is connected to the load in a predefined manner and has input terminals for receiving three phase electric energy through external supply lines. There is provided a device within the apparatus which automatically corrects the phase sequence of the electric energy supplied to the load. An open phase protection device is provided which allows the starting of the load in response to the absence of open phase in the received electric energy, and inhibits the starting of the load in response to the presence of open phase in the received electric energy due to, for example, breaking of an external supply line. In one embodiment, the apparatus is built into a submersible motor-pump assembly. The pump is always initiated to rotate its impeller in a proper direction for pumping, regardless of correct or incorrect phase connections between the external supply lines and the input terminals of the apparatus. The open phase sensor and associated switches prevent a single phase mode of operation of the load.

15 Claims, 6 Drawing Figures

4,667,264

APPARATUS FOR CONTROLLING THE STARTING OF A THREE PHASE LOAD WITH ITS NORMAL PHASE SEQUENCE

This application is a continuation of application Ser. No. 641,556, filed Aug. 16, 1984, now abandoned.

FIELD

The present invention relates to an apparatus for starting a three phase load with a predetermined phase sequence of electric energy supplied thereto. The present invention is most applicable to a three phase induction motor driven submersible pump.

BACKGROUND OF THE INVENTIION

Certain polyphase loads work normally only when a determined phase sequence of polyphase electric energy is applied thereto. For example, three phase motor driven submersible pumps can function as pumps only when their impellers rotate in one direction with a determined phase sequence of electric power being supplied to the motors. With a reverse phase sequence, the submersible pumps will no longer perform their pumping action. However, it very often happens, particularly at a construction site that the impellers rotate in a reverse direction as the result of wiring and connection between the motor and an electric power supply. To change the rotational direction for pumping, an operator must change manually the phase sequence of electric power to be supplied to the three phase motor by, for example, changing the connections of wires to the supply terminals of an electric panel board.

The foregoing is due to the fact that conventional submersible motor-pumps do not have means which automatically corrects the phase sequence of the supplied power for pump operation.

Japanese Utility Model Application No. 56-133254 filed on Sept. 8, 1981 by the assignor of the present application discloses an automatic phase sequence correction device built in to a motor-driven submersible pump casing. More specifically, the device comprises a phase sequence sensor branched off from supply lines to the motor and including a relay coil which is sufficiently energized in response to a reverse phase sequence or rotation of the supplied three phase electric power carried by the supply lines. The device further includes a phase changing circuit connected in two phases of the supply lines and including two transfer contacts of the above relay connected in the respective phases thereby to assure that the desired phase sequence of electric power is applied to the motor. The above two phases of the supply lines further include normally open contacts which are closed when their associated auxiliary relay is activated after the position of the phase changing circuit has been established by the phase sequence sensor.

Whereas the above device assures the application of the desired phase sequence of electric power to the motor such as to cause the pump to operate, the device lacks open phase protection capability. More specifically when a supply line which is not associated with the auxiliary relay is open phase due to, for example, breaking of the line, the motor will run with a single phase resulting in damage to the motor.

SUMMARY OF THE INVENTION

In accordance with the present invention, there is provided an apparatus for controlling the starting of a three phase load which comprises phase sequence sensing means connected to supply lines to the load for sensing a phase sequence of electric energy carried by the supply lines, phase changing means connected to the supply lines for correcting the phase sequence of electric energy finally supplied to the load in accordance with an output signal of the phase sequence sensing means, open phase sensing means connected to the supply lines for sensing an open phase in any one of the supply lines, and switch means associated with the open phase sensing means for permitting the starting of the load by the supply lines through phase changing means set up by the phase sequence sensing means and for inhibiting the starting of the load when the supply lines includes an open phase.

An object of the present invention is to provide an apparatus which obviates the open phase problem discussed in the background to this invention.

Another object of the present invention is to provide an economical apparatus having both automatic phase correction and open phase protection capabilities.

Another object of the present invention is to provide such an apparatus which is most applicable to a three phase induction motor driven submersible pump.

A still further object of the present invention is to provide such an apparatus which is built in to a submersible motor-pump assembly.

Panels for distribution of electric power to various loads including a submersible motor-pump usually have certain circuit protection devices such as over-current relay and ground fault protection device. The above automatic phase correction and open phase protection capabilities of the present invention are compatible with the protection devices on the panels and they cooperate with each other to meet practically all the requirements regarding a three phase load circuit system.

BRIEF DESCRIPTION OF THE DRAWINGS

The above and other objects, features and advantages of the present invention will be apparent from the following description in conjunction with the accompanied drawings in which.

DETAILED DESCRIPTION OF THE PREFERRED EMBODIMENT

Figure 1:
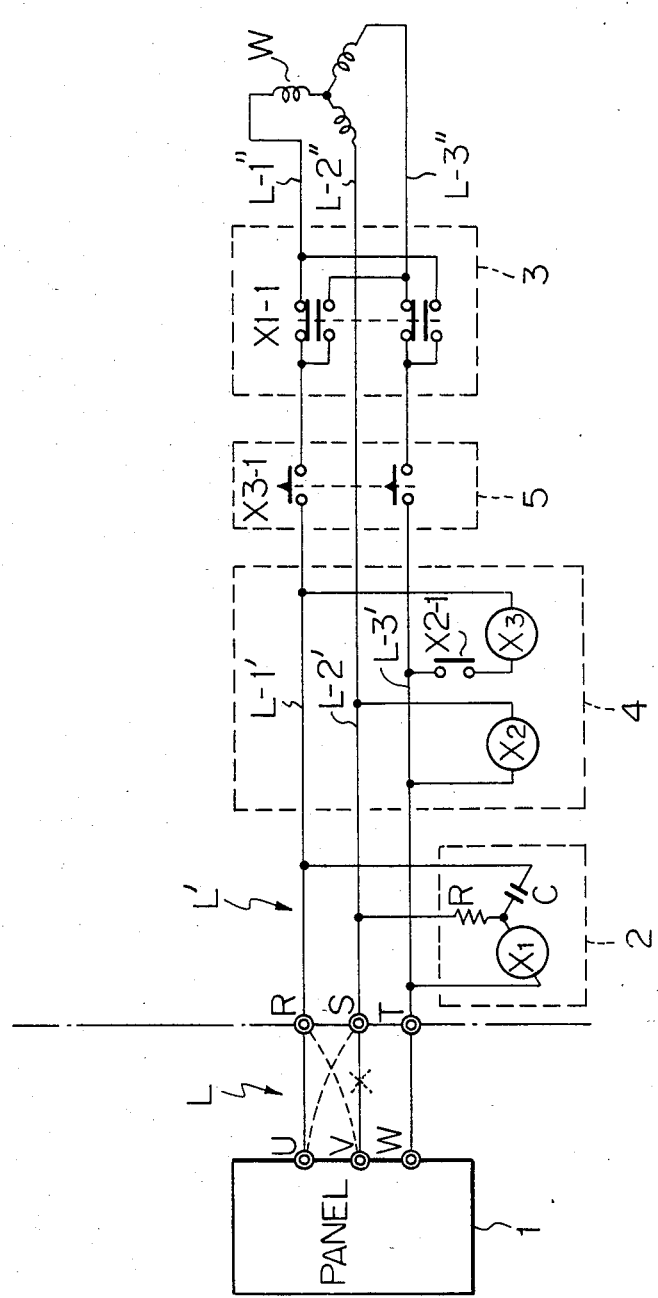
FIG. 1 is an electric circuit diagram illustrating an embodiment of the present invention.

Referring first to FIG. 1, there is shown a circuit diagram of an apparatus in accordance with the present invention. The apparatus has input terminals R, S and T for receiving three phase electric energy through external supply lines. In the illustrated embodiment, the input terminals are connected to supply terminals U, V and W of an electric distribution panel 1 through external supply lines L which may be comprised of a cable.

Internal supply lines L', that is supply lines within the apparatus, are connected to the input terminals to carry the three phase energy to a load which, in the illustrated example, is a three phase induction motor having primary windings indicated by W.

The apparatus includes phase sequence sensing means which senses a phase sequence of the three phase energy received on the supply lines L'. The illustrated phase sequence sensing means is a star connected network 2 which branches off from the internal supply lines L' and includes a capacitor C connected to a first line L-1' of the internal supply lines, a resistor R connected to a second internal supply line L-2', and a coil $X_1$ of a first relay connected to a third internal supply line L-3'. In brief, the relay coil X' is sufficiently energized in response to a reverse phase sequence of the received three phase energy. For a forward phase sequence, the coil X is insufficiently energized so that the associated relay contacts are not moved.

Figure 3:
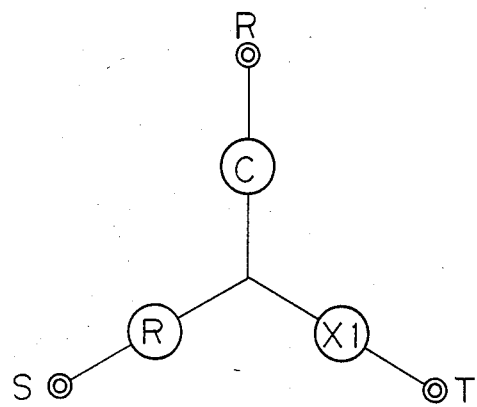
FIG. 3 is a circuit diagram of a phase sequence sensor useful in the apparatus of the present invention.
Figure 4:
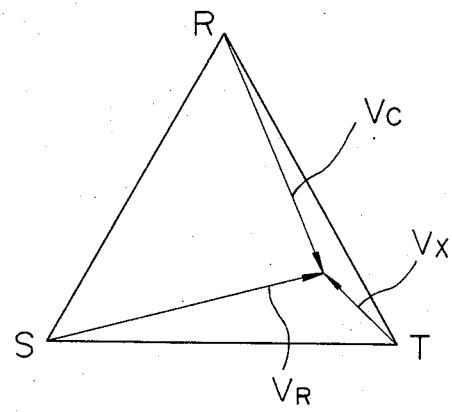
FIGS. 4 and 5 are vector diagrams showing how the phase sequence sensor in FIG. 3 operates.

A more detailed description of the operation of the relay type phase sequence sensor 2 will now be given by reference to FIGS. 3 through 5. FIG. 3 represents connections of the respective elements of the phase sequence sensor relative to the phase terminals R, S and T. In FIG. 4 it is assumed that the phase sequence of the three phase energy received on terminals R, S and T is a forward sequence. In this case, the voltage across the capacitor C is represented by a vector $V_C$, the voltage across the resistor R is expressed by a vector $V_R$ and the voltage across the relay coil $X_1$ is expressed by a vector $V_X$. As you will note, the coil voltage $V_X$ is relatively small so that the coil $X_1$ is insufficiently energized with the associated contacts retaining their positions.

Figure 5:
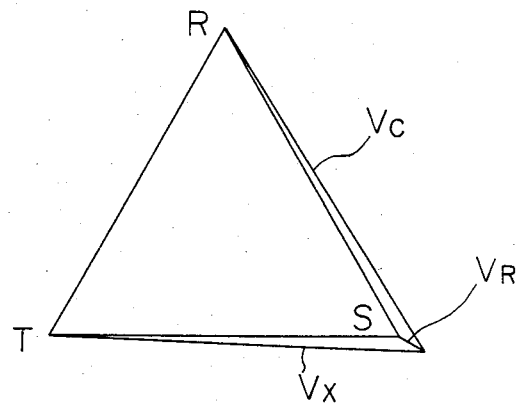

FIG. 5 assumes a reverse phase sequence of the received three phase energy. As will be noted, the voltage $V_X$ across the relay coil $X_1$ is relatively large so that the coil $X_1$ is fully excited such as to operate the associated contacts.

Turning back to FIG. 1, the apparatus further includes a phase change-over circuit which is connected in the internal supply lines L' and corrects the phase sequence of the electric energy supplied to the load in accordance with the output signal of the phase sequence sensing means. In the illustrated example, the phase change-over circuit includes four switching elements of relay contact type. These contacts designated by $X_{1-1}$ are contacts of the first relay which are positioned by the first relay coil $X_1$ of the phase sequence sensing means.

A first or uppermost one of these contacts is a normally closed contact connected between a first line of those supply lines that are input to the phase change-over circuit 3 and a first line L-1" of those supply lines that are output from the phase change-over circuit. A second contact is normally open and is connected between the first input supply line and a third output supply line L-3". A third contact is normally closed and is connected between a third input supply line and the third output supply line L-3". A fourth or bottom contact is normally open and is connected between the third input line and the first output line.

The operation of the phase change-over circuit 3 is as follows. When the phase sequence sensor 2 detects a normal or forward phase sequence of the received three phase energy, the relay coil $X_1$ is insufficiently energized so that the associated contacts $X_{1-1}$ in the phase changeover circuit 3 will retain their normal positions. Thus, the first, second and third input lines connect respectively to the first, second and third output lines which are connected to the respective one of the primary windings W of the three induction motor.

On the other hand, when the phase sequence sensor 2 detects a reverse phase sequence of the received three phase energy, because of, for example, incorrect connections of external supply lines between the supply terminals of the panel to the input terminals of the apparatus as exemplified by dotted lines in FIG. 1, the first relay coil $X_1$ is fully energized to move the associated contacts $X_{1-1}$ in the phase change-over circuit 3. As a result, the first input line connects to the third output line L-3" and the third input line connects to the first output line L-1", thus changing or reversing the phase sequence of electric energy.

In accordance with the present invention, the apparatus further includes open phase sensing means which is connected to the internal supply lines L' and senses an open phase of the received electric energy. In the illustrated example, the open phase sensing means 4 comprises two open phase sensing circuits; the first is connected across the second and third internal supply lines connected to input terminals S and T and includes a relay coil $X_2$ while the second is connected across the first and third internal supply lines connected to input termianls R and T and includes a relay coil $X_3$ in series with a normally open contact of the relay coil $X_2$. The coil $X_2$ is energized when input terminals S and T are active i.e. electric energy is present on the pick up points on the second and third internal lines, while the coil $X_3$ is energized only when electric energy is present on all the input terminals R, S and T, i.e. when there is not open phase in the received three phase electric energy.

Associated with the open phase sensing means is a switch means which permits the starting of the load when the open phase sensing means indicates the absence of open phase in the received electric energy, and inhibits the starting of the load when the open phase sensing means indicates the presence of open phase. In the illustrated embodiment, the switch means 5 comprises two normally open and time delay contacts of the relay associated with the coil $X_3$ which contacts are respectively connected in the internal supply lines L-1"and L-3'.

The operation of the switch means is as follows. When the supply lines includes an open phase due to, for example, breaking of an external supply line, say the line connecting the supply terminal V of the panel 1 to the input terminal S of the apparatus, as indicated by a cross mark "✕", the coil $X_2$ and accordingly the coil $X_3$ remain de-energized, so that the contacts $X_{3-1}$ retain their normal open position, thus inhibiting the starting of the load which in the present case is the three phase induction motor. On the other hand, when all the lines upstream of the open phase sensor 4 are active, both the coils $X_2$ and $X_3$ are energized. After a predetermined time, the contacts $X_{3-1}$ are closed to permit the starting of the load.

A delayed or slow action of the contacts $X_{3-1}$ assures that the electric power is supplied to the load after the phase change-over circuit 3 has been set up by the phase sequence sensor 2, thus avoiding the operation of the phase change-over circuit with a current flowing therethrough.

If the contact $X_{2-1}$ is a slow action or time delay contact, this will substitute for the time delay introduced by the contacts $X_{3-1}$.

Figure 2:
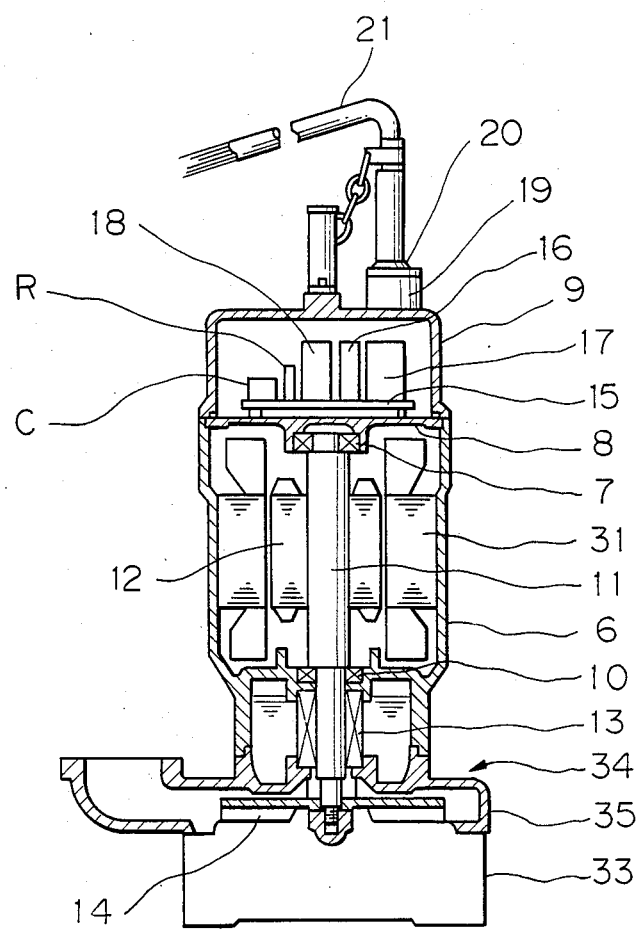
FIG. 2 is a partially and vertical sectional view of a submersible motor-pump assembly incorporating an apparatus of the present invention.

Referring now to FIG. 2, there is shown a submersible motor-pump assembly incorporating the apparatus in FIG. 1. Similar to a conventional motor pump assembly, the illustrated assembly includes a lower strainer 33 on which a pump casing 35 for a pump section 34 is mounted. A motor casing 6 is secured to the pump casing 35. A bracket 8 which is fitted into an upper part of the motor casing 6 supports an upper bearing 7. A substrate or supporting plate 15 is secured onto the bracket through electrical insulation. Various circuit components as shown in FIG. 1 are mounted on the substrate. More specifically, a relay 16 including the coil $X_1$ and the contacts $X_{1-1}$ shown in FIG. 1, an open phase relay 17 including the coil $X_2$ and the contact $X_{2-1}$, an open phase and time delay relay 18 including the coil $X_3$ and the contacts $X_{3-1}$ shown in FIG. 1, a resistor R as part of the phase sequence sensor 2 shown in FIG. 1, and a capacitor C as part of the phase sequence sensor 2 are all mounted on the substrate 15. An upper cover 9 which is fitted into the motor frame 6 encloses these components and forms a closed compartment. A drive shaft 11 is supported by the upper bearing and a lower bearing 10 which is fitted in the lower part of the motor frame 6. A motor rotor 12 is secured on the drive shaft 11 and motor stator 31 carrying the primary windings W is in face relationship with the rotor 12 through a gap and is secured to the motor frame.

The lower part of the drive shaft 11 is sealed by a shaft sealing member 13 between the motor casing 6 and the pump casing 35. An impeller 14 is mounted at the lower end of the drive shaft 11.

The input terminals R, S and T of the apparatus are connected to respective external lines of a cable 21 by a connector 20 which is sealed in a boss 19 mounted on the upper casing.

Figure 6:
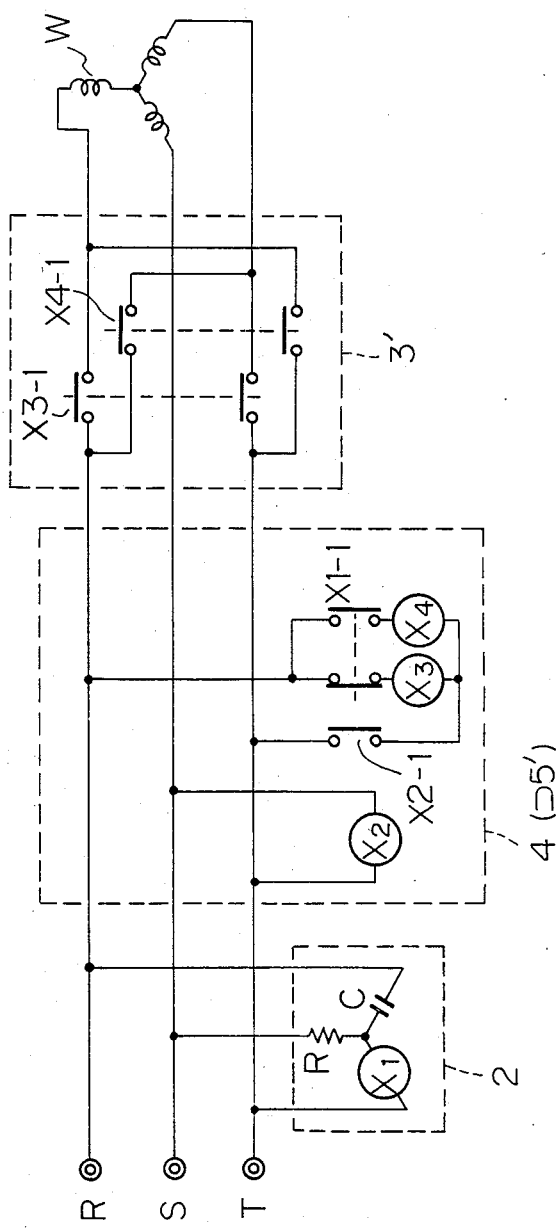
FIG. 6 is an electric circuit diagram illustrating another embodiment of the present invention.

Referring now to FIG. 6, there is shown a circuit diagram of an another embodiment of the present invention. In FIGS. 1 and 6, similar parts are identified by similar symbols or reference numerals. In comparison with the arrangement in FIG. 1, modifications are made to open phase sensing means 4' and phase changing means 3'.

In brief, the modified open phase sensing means 4' is arranged to allow the phase change-over means 3' to operate only when the open phase sensing means 4' finds that all the supply lines are active i.e. do not include any open phase. The open phase sensing means 4' functionally includes switch means 5' for controlling allowance or inhibition of starting the load. More specifically a first circuit of the open phase sensing means 4' comprises a relay coil $X_2$ connected across the second and third internal supply lines. A second circuit of the open phase sensing means 4' is connected across the first and third internal supply lines and includes the normally open contact $X_{2-1}$ associated with relay coil $X_2$ of the first open phase circuit and connected across the second and third internal supply lines. The contact $X_{2-1}$ is in series with a relay coil $X_3$ and a relay coil $X_4$ in parallel with the relay coil $X_3$. A normally closed contact $X_{1-1}$ associated with the relay coil $X_1$ of the phase sequence sensor 2 is connected in series with the relay coil $X_3$. A normally open contact associated with the relay coil $X_1$ is connected in series with the relay coil $X_4$. Accordingly, the relay coil $X_3$ is energized only when the supply lines carry a normal or forward phase sequence of electric energy and do not have any open phase. The relay coil $X_3$ is energized only when the supply lines carry a reverse sequence of electric energy and do not have any open phase. In other words, auxiliary relay coils $X_3$ and $X_4$ serve both as an open phase sensing element and as a phase sequence confirming element.

The phase change-over means 3' includes two normally open contacts associated with the relay coil $X_3$ and, when closed, connects the first input line to the first output line and connects the third input line to the third output line. The phase change-over means 3' further includes two normally open contacts associated with the relay coil $X_4$, and, when closed, connects the first input line to the third output line and connects the third input line to the first output line, thus reversing the phase sequence supplied to the load.

The overall operation of the arrangement in FIG. 6 is essentially the same as the operation of the arrangement in FIG. 1, and explanation thereof will therefore be omitted.

While the present invention has been described with respect to the preferred embodiments, various modifications and variations can be made with out departing from the scope of the invention.

For example, phase sequence sensing means 2, phase change-over means 3 or 3', open phase sensing means 4 or 4' and switch means 5 or 5' can be implemented by a solid state technique using semiconductor devices.

What is claimed is:

1. An apparatus for controlling the starting of a three phase load with its normal phase sequence comprising:

input terminals for receiving a three phase electric energy through external supply lines;

internal supply lines coupled to said terminals for carrying said three phase electric energy to said load;

phase sequence sensing means coupled to said internal supply lines for sensing a phase sequence of the received three phase energy;

phase change-over means connected in said terminal supply lines for reversing the phase sequence of the electric energy supplied to said load when said phase sequence sensing means senses a reverse phase sequence of the received three phase energy;

open phase sensing means having a first circuit connected across the first and second lines of said supply lines for sensing the presence or absence of an open phase in the first and second lines of said internal supply lines and a second circuit connectes across the second and third lines of said internal supply lines and including a time delay means operated by said first circuit, after a predetermined time from the operation of said first circuit thereby enabling said second circuit to detect ther presence of absence of an open phase in any one of said internal supply lines; and switch means coupled to said open phase sensing means for permitting the starting of said load by said supply lines through said phase change-over means after a predetermined time from the operation of said first circuit when said open phase sensing means detects the absence of an open phase and for inhibiting the starting of said load when said phase sensing means detects the presence of an open phase.

2. An apparatus as claimed in claim 1, wherein said phase sequence sensing means produces a first signal in response to a forward phase sequence of the received three phase energy and produces a second signal in response to a reverse phase sequence of the received three phase energy, and wherein said phase changeover means allows the load to be driven by the sensed phase sequence of the received three phase energy in response to the said first signal of said phase sequence sensing means and reverses the phase sequence of the electric energy supplied to said load in response to said second signal of said phase sequence sensing means, whereby said load is always initiated by a forward or normal phase sequence of the electric energy.

3. An apparatus as claimed in claim 2, wherein said phase change-over means includes four normally open switch elements, the first of which is disposed between a first line of those supply lines which are input to said phase change-over means and a first line of those supply lines which are output from said phase change-over means, the second of which is disposed between a second line of said input supply lines and a second line of said output supply lines, the third of which is disposed between the first line of said input supply lines and the second line of said output supply lines, and the fourth of which is disposed between the second line of said input supply lines and the first line of said output supply lines, and wherein said first and second switch elements are closed in response to said first output signal of said phase sequence sensing means whereas said third and fourth switch elements are closed in response to said second output signal of said phase sequence sensing means.

4. An apparatus as claimed in claim 2, wherein:
said phase change-over means includes four switch elements, the first of which is normally closed and disposed between a first line of those supply lines which are input to said phase change-over means and a first line of those supply lines which are output from said phase change-over means, the second of which is normally closed and is disposed between a second line of said input suppyly lines and a second line of said output supply lines, the third of which is normally opened and is disposed between the first line of said input supply lines and the second line of said output supply lines, the fourth of which is normally opened and is disposed between the second line of said input supply lines and the first line of said output supply lines; and wherein said four switch elements retain their positions unchanged in response to said first output signal of said phase sequence sensing means, wherein said four switch elements change their positions in response to said second output signal of said phase sequence sensing means, whereby said load is always initiated by its normal phase sequence of three phase electric energy.

5. An apparatus as claimed in claim 1, wherein:
said switch means is normally open and is connected in said internal supply lines, wherein said time delay means in said second circuit operates in such a way that the operation of said switch means associated with said open phase sensing means occurs after the position of said phase change-over means has been established by said phase sequence sensing means.

6. An apparatus as claimed in claim 3, wherein said switch means associated with said open phase sensing means is arranged to allow said phase change-over means to operate in accordance with the output signal of said phase sequence sensing means only when the position of said switch means is established as a result of the absence of open phase lines as sensed by said open phase sensing means.

7. An apparatus as claimed in claim 1, wherein said phase sequence sensing means includes a coil of a first relay, wherein said phase change-over means includes relay contacts which are directly or indirectly inactivated by said first relay.

8. An apparatus as claimed in claim 7, wherein:
said phase sequence sensing means comprises a star connected network which branches off from said internal supply lines and includes a coil of said first relay,
a resistive element, and a
capacitive element such that said coil is sufficiently excited in response to a reverse phase sequence of the received three phase electric energy.

9. An apparatus as claimed in claim 7, wherein said first circuit of said open phase sensing means comprises:
a coil of a second relay connected across the first and second lines of said internal supply lines.

10. An apparatus as claimed in claim 9, wherein:
said second circuit of said open phase sensing means includes a normally open contact of said second relay in series connected with a coil of a third relay, and wherein said switch means comprises at least two contacts of said third relay which are respectively connected in two different lines of said internal supply lines.

11. An apparatus as claimed in claim 10, wherein:
said contact of said second relay is a time delay contact.

12. An apparatus as claimed in claim 10, wherein:
said contact of said third relay are time delay contacts.

13. An apparatus as claimed in claim 1, wherein said phase sequence sensing means comprises:
a coil of a first relay;
wherein said first circuit includes a relay coil connected across the first and second lines of said internal supply lines;
wherein said second circuit includes a contact of said relay of said first circuit, first and second auxiliary relay coils in parallel with each other and in series with said contact, a normally open contact of said first relay of said phase sequence sensing means which contact is connected in series with said first auxiliary relay coil; and
a normally closed contact of said first relay which contact is connected in series with said second auxiliary relay coil, and wherein said phase change-over means includes contacts of said auxiliary relays.

14. An apparatus as claimed in claim 13, wherein said phase sequence sensing means, said phase change-over means, said open phase sensing means and said switch means are all built in a casing of said motor driven submersible pump.

15. An apparatus as in claims 1-13, wherein said load comprises:
a three phase electric motor for driving a submersible pump.

* * * * *